United States Patent Office 2,731,373
Patented Jan. 17, 1956

2,731,373

ELECTRODE FLUX COVERING FOR COPPER AND COPPER-BASE ALLOY CORE MATERIALS

Rene David Wasserman, Stamford, Conn., and Joseph Quaas, Island Park, N. Y., assignors to Eutectic Welding Alloys Corporation, New York, N. Y., a corporation of New York No Drawing. Application August 10, 1954,
Serial No. 448,995

5 Claims. (Cl. 148—26)

This invention relates to the production and use of a new and improved flux for metal joining processes, particularly to the type of fluxes used for arc welding metal alloys. Specifically, the invention relates to an improved fluxing composition for application as a covering to pure copper electrode core wire intended for use in an arc welding operation on pure copper, copper base alloys, copper clad metals and similar materials.

In the arc welding of such metals it is necessary to operate at substantially higher welding temperatures than normally required for dissimilar metals due to the greater heat dissipating property of copper. As a result, operations performed upon copper and copper base alloys often tend to include excessive oxidation as a primary obstacle preventing the formation of a sound weldment. It will be readily understood by those skilled in the art that the formation of copper oxide during the welding treatment substantially always decreases the strength of the finished joint, the amount of cuprous oxide formed proportionately reducing the strength thereof. In particular, the art has experienced great difficulty in eliminating blowholes and surface pits from the weldment.

It is, therefore, a prime object of the present invention to obviate the above-noted inefficiencies by providing a special covering composition for copper and copper base alloy core rods which will function to render welding with such rods easier. Another object of the invention is to provide a covering composition which prevents oxidation of the parent material being treated during the welding operation and which can be applied to the core metal so as to form a directing crater confining the electrode arc to a narrow oriented flame, thereby minimizing any tendency towards excessive oxidation. Other objects will become apparent from the following description and claims.

It is known that certain prior covering compositions for copper and copper alloy electrode core materials have been fairly effective in improving the technique of welding copper and copper alloy materials, as for example, as set forth in U. S. Patent No. 2,463,096. Such prior fluxes have included small amounts of slag-forming ingredients and unusually large amounts of sodium and potassium silicate which have heretofore been considered as the essential activating ingredient of a flux suitable for use with copper and copper base alloys. Applicant, on the other hand, has found that a much improved result can be obtained by employing a covering composition having a relatively large proportion of slag-forming ingredients such as the carbonates, silicates and fluorides of the alkaline earth metals by the addition of a substantial amount of an oxide of titanium and a large amount of lepidolite. In addition, it has been found desirable and suitable in most instances to include smaller amounts of deoxidizers, such as ferrous oxide, copper-titanium alloy powder and/or carbon in the form of graphite along with a scavenging material such as manganese, silicon and aluminum, preferably in combined form as an alloy metal powder such as the silicon-aluminum-manganese-iron powder commercially available for powdered metallurgy practices.

The ingredients of the coating composition may be compounded in granular or powdered form as by comminuting and mixing the ingredients in a rotary mill as dry constituents, or in the presence of a vehicle comprising water soluble silicates, resin, a low melting point glass, or starch, as a binder material. In practice, it is preferred to apply the covering composition to the core rod of the electrode by extruding the same as a plastic mass containing a suitable binder over the core wire and subsequently drying the extruded covering in a conventional furnace or the like.

One of the unusual advantages of the present covering composition is the action of the lepidolite, an inexpensive potassium-lithium-aluminum fluosilicate which performs a multitude of inherent functions and reduces the number of costly constituents required. Lepidolite is a chemical compound occurring in nature and normally consisting of 4.3 per cent lithium oxide, 51.74 per cent silicon dioxide, 27.5 per cent aluminum trioxide, 7.4 per cent potassium oxide, 7.2 per cent fluorine, 2.2 per cent rubidium oxide and 0.94 per cent sodium oxide.

The fluorine content of the compound is instrumental in cleansing the copper and copper base alloy when activated at the high temperature present during the welding treatment in a manner known in the art. The rubidium content together with the potassium and lithium oxides function as excellent arc stabilizing agents; in addition, these oxides plus the oxides of aluminum and silicate, which are present in part, materially contribute towards a necessary heavy slag formation resulting in complete overall slag coverage of the area under treatment. It will be readily understood that this latter function is a precursor to the elimination of excessive oxidation in the weldment.

The slag-forming component of the flux composition preferably comprises calcium carbonate and calcium fluoride in almost equal proportions along with a lesser proportion of talc and a small amount of barium carbonate. It will be understood, however, that other conventional well-known slag-forming constituents such as potash, feldspar, aluminum silicate, and clays can be used in part in place of the talc and calcium carbonate constituents. Additionally, it will be apparent to those skilled in the art that cryolite, sodium fluoride and lithium fluoride may be substituted, in whole or in part, for the calcium fluoride constitutent. Although copper-titanium alloy powder has proved to be unsurpassed as a dioxidizer, other similar metal alloy powders can be used with slightly less effectiveness. For example, ferro-titanium and other titanium bearing alloys may be used to replace the copper-titanium constituent in whole or in part.

In its broader aspects, the composition of the invention may be described as a lime-fluoride flux consisting essentially of a mixture of substantially equal parts (plus or minus 10 per cent) of calcium carbonate, calcium fluoride, lepidolite and titanium dioxide with the remainder consisting of dioxides and slag-forming constituents selected from the groups of ingredients indicated above. For commercial applications to pure copper core wire, it is generally preferred that the four essential ingredients aggregate approximately 80 per cent by weight of the total mixture. For other more general applications, it is preferred that the essential ingredients of the composition aggregate at least 58 parts weight but less than 100 parts by weight while the remainder comprises between 6 and 20 parts arc stabilizers selected as previously indicated and between 1 and 25 parts deoxidizers selected as previously indicated. As a general rule, however, the calcium carbonate must be present in at least 18 parts by weight and the calcium fluoride and lepidolite must be present in at least 15 parts by weight each while the remaining constituents may be present in lesser amounts although better results will be obtained when the per cent of these latter ingredients is proportionately increased as the amount of the essential ingredients are decreased.

It is preferred in practice to compound the coating composition by combining a mixture of constituents with a suitable binder, preferably of the water soluble silicate type, in the following proportional amounts:

| Dry ingredients: | Range of parts by weight |
|---|---|
| Calcium carbonate | 18–25 |
| Calcium fluoride | 15–30 |
| Lepidolite | 15–25 |
| Talc | 5–10 |
| Titanium dioxide | 10–20 |
| Barium carbonate | 0.1–10 |
| Graphite | 0.1–5 |
| Copper-titanium | 0.1–10 |
| Ferrous oxide | 0.1–5.0 |
| Zirconium silicate | 1.0–5.0 |
| Silicon-aluminum-manganese-iron alloy | 0.1–5 |

A preferred form of the invention which has been applied to pure copper and copper alloy core materials with unusually advantageous results was formed with the following proportions:

| Dry ingredients: | Preferred range in parts by weight |
|---|---|
| Calcium carbonate | 20 |
| Calcium fluoride | 24 |
| Lepidolite | 20 |
| Talc | 5 |
| Titanium dioxide | 15 |
| Barium carbonate | 3 |
| Graphite | 3 |
| Copper-titanium | 4 |
| Ferrous oxide | 2 |
| Zirconium silicate | 2 |
| Silicon-aluminum-manganese-iron alloy | 2 |

The invention is intended primarily for application to pure copper core metal, but the copper may include small additions of silver, silicon, phosphorus and nickel in accordance with the known practices in the art. One of the unique advantages of the instant covering composition is its ready and inherent adaptation to application as a relatively thick covering of between 0.2 and 0.5 inch on the core wire, thereby serving to form a cohering peripheral sleeve which extends beyond the arcing end of the wire during energization of the electrode as in an arc welding operation. The presence of the extended, cohering sleeve-like tip of the covering is not per se new in welding technique, having been provided with other covering compositions known in the art, but is difficult to obtain without incorporating prohibitively expensve components or components having deleterious effects as constituents of the covering. It was, therefore, unexpected to discover that the instant covering composition inherently provided such phenomena which operates to maintain a narrow arc gap and concentrate the heat of the arc directing it into the parent material as a concentrated jet whereby the accelerated heat dissipation characteristic of copper and copper base alloys is compensated for in cooperation with the heavy slag formed. In addition, the presence of the heavy slag, which is readily flowable, operates to induce a preheating during the initial welding traverse and serves to facilitate proper fusing of the coppr filler metal and the parent material being treated.

Another unexpected advantage of the instant covering composition is the fact that although it includes a substantially large amount of a carbonate producing a jet-like blanket of axially directed gas at the arcing end of the electrode, the transfer of the core metal towards the parent metal takes place as fine molten droplets without splatter. As a result, an electrode of copper and preferably one containing small additions of silver, silicon, phosphorus and nickel covered by the composition of the invention has been proven to be very effective for facing various parent metals such as steel and iron alloys with a copper or copper alloy cladding. Yet another unexpected advantage of the invention is the ability of the composition to employ relatively large proportions of deoxidizers, thus insuring the reduction of copper oxide formed during the deposition of the electrode, without detracting from the desired non-splatter character of the arc operation.

As many apparently widely different embodiments of this invention may be made without departing from the spirit and scope hereof, it is to be understood that this invention is not limited, except as defined in the appended claims.

What is claimed is:

1. A coating composition adapted for use as a covering on a copper or copper alloy arc welding electrode consisting of between 18 and 25 parts of calcium carbonate, 15 and 30 parts of calcium fluoride, 15 and 25 parts of lepidolite, 5 and 10 parts of talc, 10 and 20 parts of titanium dioxide, .1 and 10 parts barium carbonate, .1 and 5 parts of graphite, .1 and 10 parts of copper-titanium, 1.0 and 5 parts of ferrous oxide, 1 and 5 parts of zirconium silicate, and .1 and 5 parts of silicon-aluminum-manganese iron alloy, all parts being by weight.

2. A coating composition adapted for use as a coating on a copper or copper alloy arc welding electrode consisting of 20 parts calcium carbonate, 24 parts calcium fluoride, 20 parts lepidolite, 5 parts talc, 15 parts titanium dioxide, 3 parts barium carbonate, 3 parts graphite, 4 parts copper-titanium, 2 parts ferrous oxide, 2 parts zirconium silicate, and 2 parts silicon-aluminum-manganese iron alloy, all parts being by weight.

3. A coating composition for application to copper electrode core wires consisting of intimately mixed particles held together as a coherent mass by a binder, said mixture consisting essentially of more than 18 parts calcium carbonate and 15 parts calcium fluoride each, more than 15 parts lepidolite and 10 parts titanium dioxide each, and less than 5 parts each of talc, barium carbonate, graphite, copper-titanium, ferrous oxide, zirconium silicate, and silicon-aluminum-manganese iron alloy, all parts being by weight.

4. A composition suitable for application to a metallic electrode core for use in an electric arc welding operation comprising a mixture of substantially equal parts of calcium carbonate, calcium fluoride, lepidolite, and titanium dioxide, said ingredients aggregating 80 per cent by weight of the total mixture, the remainder consisting of deoxidizers selected from the group consisting of metal alloy powders and graphite and slag-forming constituents selected from the group consisting of talc, zirconium silicate, potash, feldspar, aluminum silicate and clay.

5. A lime-fluoride flux composition for use in the arc welding of copper and copper alloy materials consisting essentially of a mixture of slag-forming ingredients, arc stabilizer ingredients and deoxidizer ingredients combined in a coherent mass by a water soluble binder, and in which said slag-forming ingredients comprise at least 33 parts and are selected from the group consisting of the carbonates, silicates and fluorides of the alkaline earth metals, lepidolite and light metal oxides, and said arc stabilizers comprise between 6 and 30 parts selected from the group consisting of titanium dioxide and heavy metal oxides, and said deoxidizers comprise between 1 and 35 parts selected from the group consisting of metal alloy powders and graphite, all parts being by weight.

No references cited.